Nov. 25, 1924.　　　　　　　　　1,516,978
N. H. NELSON
SIGNALING DEVICE FOR VEHICLES
Filed March 23, 1922　　4 Sheets-Sheet 1
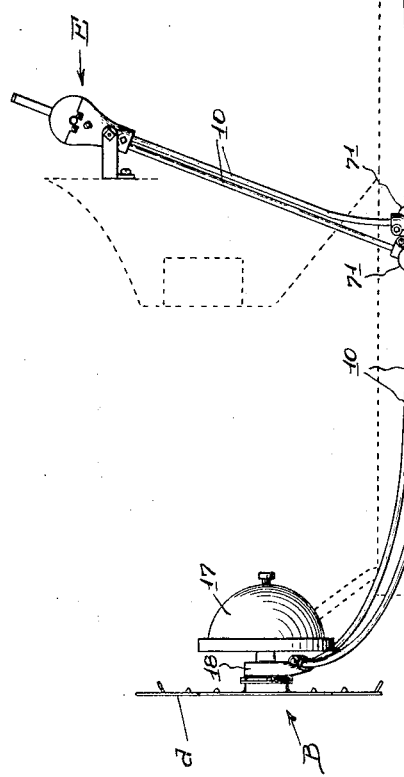
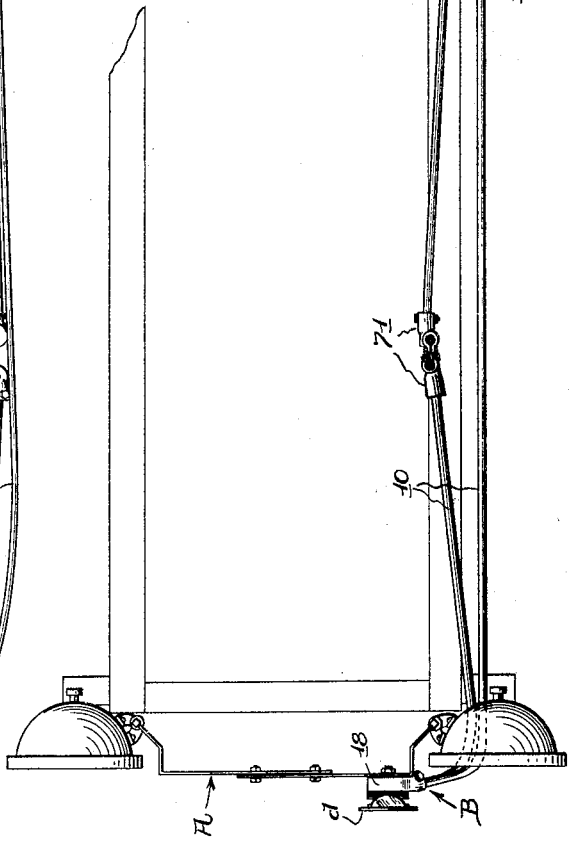
Inventor
Nels H. Nelson
By Bradbury + Caswell
Attorneys Nov. 25, 1924.  
N. H. NELSON  
1,516,978  
SIGNALING DEVICE FOR VEHICLES  
Filed March 23, 1922   4 Sheets-Sheet 2
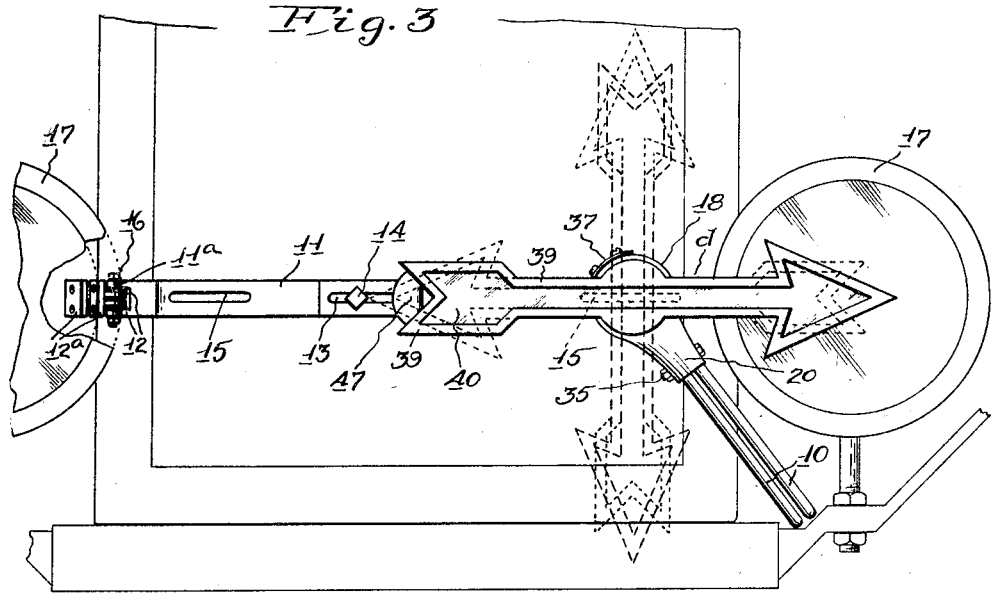
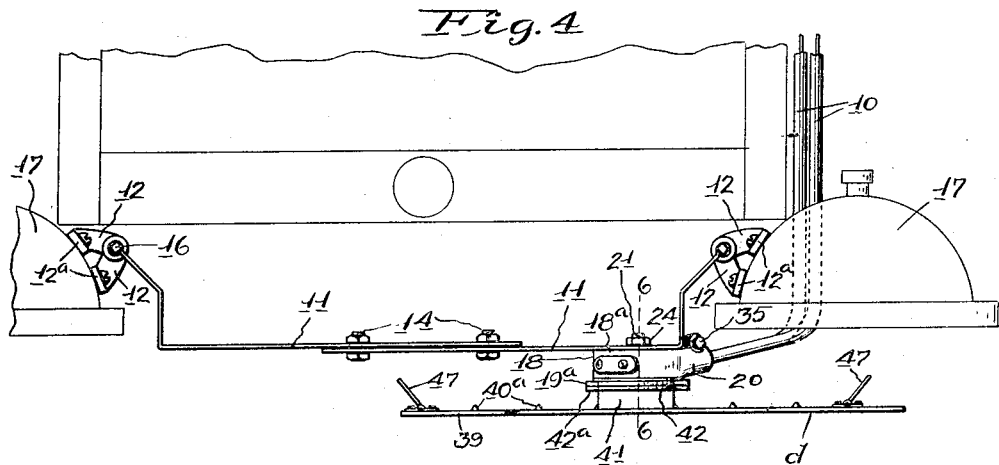
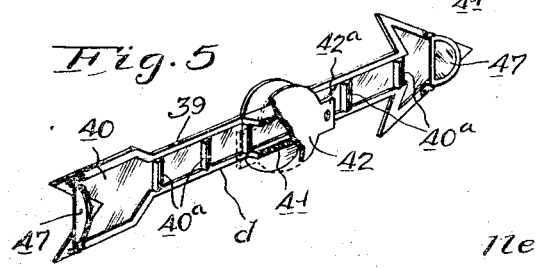
Inventor  
Nels H. Nelson  
By Bradbury & Caswell  
Attorneys Nov. 25, 1924.
N. H. NELSON
SIGNALING DEVICE FOR VEHICLES
Filed March 23, 1922    4 Sheets-Sheet 3
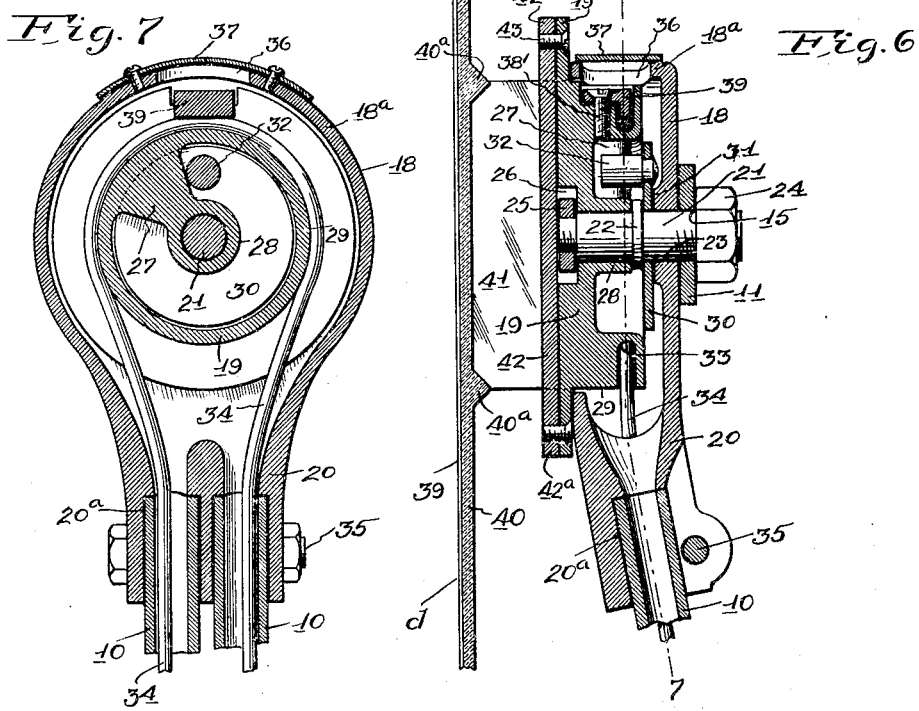

Nov. 25, 1924.  
N. H. NELSON  
1,516,978  
SIGNALING DEVICE FOR VEHICLES  
Filed March 23, 1922    4 Sheets-Sheet 4
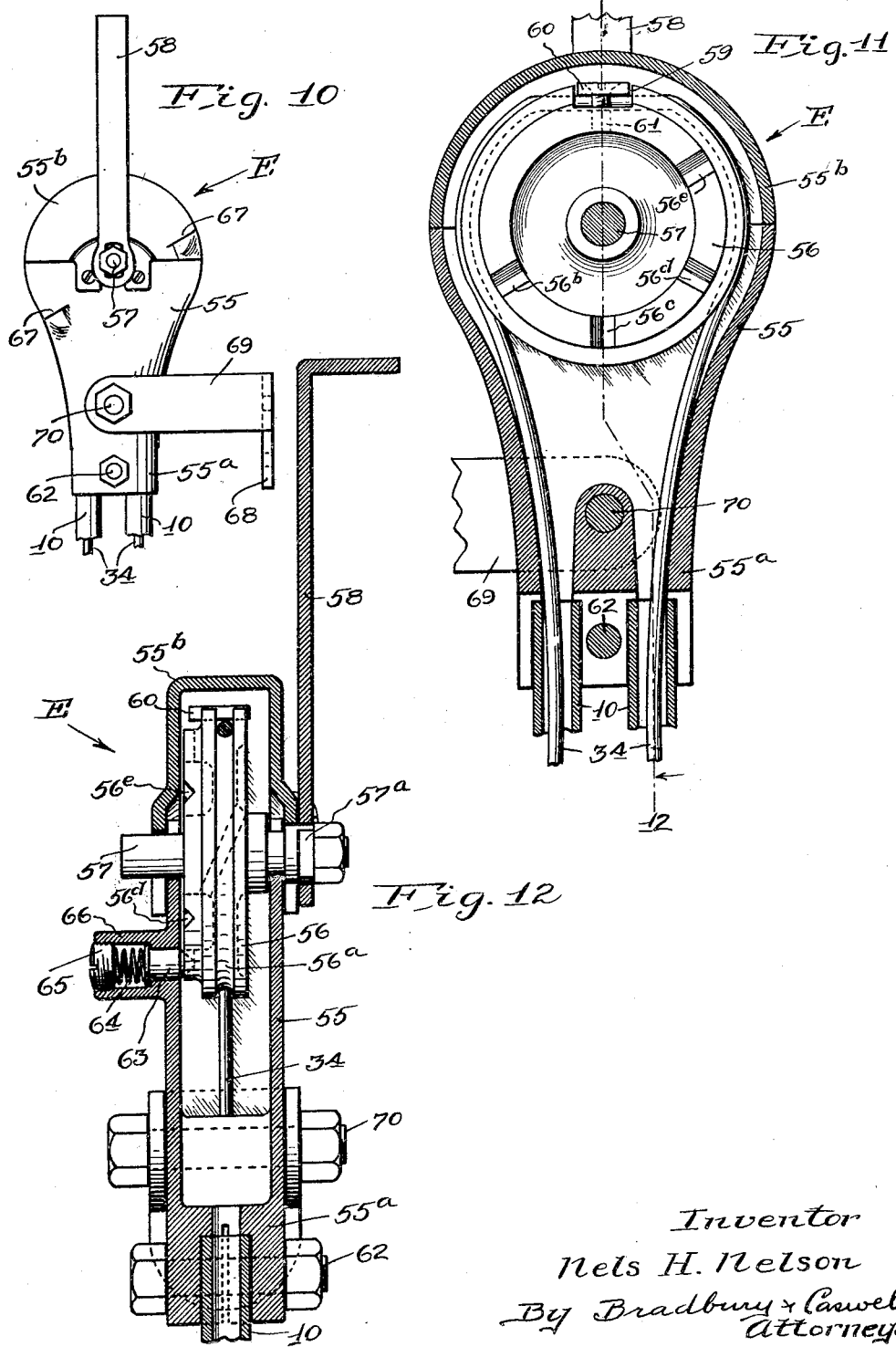
Inventor  
Nels H. Nelson  
By Bradbury & Caswell  
Attorneys Patented Nov. 25, 1924.

1,516,978

UNITED STATES PATENT OFFICE.

NELS H. NELSON, OF WILLMAR, MINNESOTA.

SIGNALING DEVICE FOR VEHICLES.

Application filed March 23, 1922. Serial No. 546,140.

*To all whom it may concern:*

Be it known that I, NELS H. NELSON, a citizen of the United States, residing in Willmar, in the county of Kandiyohi and State of Minnesota, have invented a new and useful Signaling Device for Vehicles, of which the following is a specification.

My invention relates to improvements in signaling devices for vehicles.

Its object is to provide a simple, durable and efficient signaling device, positively controlled and universally applicable to the various types of vehicles, said device being adapted to clearly indicate premeditated changes in travel at night as well as at day.

With the foregoing and other objects in view, which will appear in the following description, the invention resides in the novel combination and arrangement of parts and in the details of construction hereinafter described and claimed.

In the accompanying drawings, Fig. 1 is a side view of an assembled device embodying my invention; Fig. 2 is a plan view of said device assembled; Fig. 3 is a front indicator arm and support therefor, the same being shown in connection with a vehicle and lamp thereon; Fig. 4 is a plan view of the structure seen in Fig. 3; Fig. 5 is a perspective view of the front indicator arm, parts being broken away; Fig. 6 is an enlarged sectional view illustrating the front indicator housing and arm, said view being taken as on the line 6—6 of Fig. 4, with the arm in upright position; Fig. 7 is a sectional view taken on the line 7—7 of Fig. 6; Fig. 8 is a perspective view of the rear indicator bracket; Fig. 9 is an elevation, in detail, of the cable guide joint, parts being broken away; Fig. 10 is a side elevation of the actuator and Figs. 11 and 12 are longitudinal, sectional views of the actuator, the latter being taken on the line 12—12 of Fig. 11.

Referring to the drawings (Figs. 1 and 2), it will be observed that my improvement includes a front bracket A, a front signal B, a rear bracket C, a rear signal D, a cable actuator E and tubular cable guides 10 reaching from said signals to said actuator The front bracket A (Figs. 3 and 4) comprises two reaches 11 and a pair of anchoring clips 12 at the outer end of each reach. The inner ends of said reaches 11 have registering longitudinal slots 13 therein, and are adjustably secured together in lapping relation by fastening bolts 14 reaching through said slots. The outer end portions of the reaches 11 are turned back from the bodies thereof, thence outward, as shown, the extremities being curled to form vertically spaced bolt-receiving eyes 11$^a$. Said reaches are also slotted longitudinally as at 15, for a purpose soon to be explained.

The anchoring clips 12 are similar, each clip including an apertured attaching plate 12$^a$ and a body apertured to receive a bolt 16 carried in the eyes 11$^a$ of a reach 11. The bracket A is preferably anchored on the lamps 17 of the vehicle, the reaches 11 being extended or collapsed by suitable adjustment of the bolts 14 to secure the desired length of said bracket. The clips 12, in each pair, are capable of relative adjustment to suit the contour of the lamp housings to which they are to be applied and the apertured fastening plates 12$^a$ supply the means of attachment to the lamp housings.

The front signal D (Figs. 3, 4, 6 and 7) consists of an indicator housing 18, a combination sheave and arm support 19 and an indicator arm *d*. The housing 18 is a cup-shaped casting including an annular-like guard or flange 18$^a$ and a dual tube and cable receiving terminal or extension 20 depending from the body of the housing. A bolt 21 threaded at its extremities and formed with a shoulder 22 intermediate thereof, answers a number of purposes soon to appear. The rear end of said bolt 21 reaches through an aperture 23 in the body of the housing and also through a slot 15 in a bracket reach 11, a nut 24 being supplied for said end of said bolt. The front end of the bolt 21 furnishes a journal for the sheave 19, said sheave being held, on said journal, in position closing the front of the housing, by means of a nut 25 threaded on the bolt in the nut receiving recess 26 in the sheave 19. Said sheave is formed with a web or stop member 27 between its hub 28 and rim 29. A collar 30, loose on the bolt 21 and interposed between the shoulder 22 thereon and a boss 31 on the housing 18, carries an abutment or stop pin 32, the same lying in the path of the web 27 on the sheave 19. The rim 29 of said sheave has an external annular groove 33, which receives the turn of a cable 34 riding thereover, the reaches of said cable passing out of the housing 18 through the terminal members 20 and into the guides 10. Said guides, more fully hereinafter described, reach into enlarged bores 20ª in the terminal members 20, said members being split and supplied with clamping bolts 35 to firmly grip the guides 10. An opening 36 in the top of the housing flange 18ª, normally covered with a removable plate 37, supplies access to a screw 38' in the sheave 19, said screw serving to clamp a cable gripping-plate 38 against the cable 34. The indicator arm *d* includes an arrow-like frame 39 for a similarly shaped lens 40 of translucent glass, or the like. Spaced webs 41, reaching back from the frame 39 of the indicator arm *d* intermediate the ends thereof, join said frame with a disc-plate 42. Ears 42ª on said plate, corresponding with ears 19ª on the sheave 19, are coupled by means of screws 43 to mount the indicator arm *d* on the sheave 19. The indicator housing 18 is located on the bracket A, by sliding the bolt 21 in a slot 15 therein, so that the ends of the arm *d*, when reversed horizontally, will over-reach the front of a lamp 17. Having determined the angular position of the housing 18 best suited to the leading of the guides 10 therefrom and, also having ascertained the proper relative position of the housing 18 with respect to a lamp 17, the nut 24 is thereupon turned against a reach 11 of the bracket A with sufficient force to hold the housing 18 in place. The cable clamping plate 38 is then set so that the cable 34 can swing the arm *d* from horizontal position (solid lines Fig. 3) through 270° to upright position (Fig. 3) and back. Following the adjustment of the clamping plate 39, the collar 30 is turned into position, wherein the abutting pin 32 will engage the web 27 on the sheave 19 and limit the movement of the arm *d* at the two extremes above mentioned, the diameter of said pin 32 and width of the web 27 being correspondingly proportioned to produce such limits of movement. The desired angular adjustments of the collar 30 are readily attained by turning the arm *d* and bringing the web 27 to bear against the pin 32. With said collar 30 properly located, the nut 24 is turned tightly against the bracket reach 11. This causes the collar 30, housing 18 and reach 11 to be firmly gripped together between the shoulder 22 on the bolt 21 and the nut 24, whereby the desired angular relations of the housing 18 and collar 30 are maintained, as well as the desired horizontal position of the housing 18 with respect to the companion lamp 17. An end of the arm *d*, in front of a lighted lamp 17, is sharply outlined and the contour thereof emphasized by the similarly shaped lens portion 40 framed therein and directly illuminated by the light from the lamp. At either end of the frame 39 is a mirror or other reflector 47 hingedly secured and adjustable to the proper angle to reflect light from the lamp onto that portion of the lens not directly lighted by said lamp. The webs 41, being spaced, as above noted, avoid obstructing the reflected light and projections 40ª, traversing said lens, catch the reflected rays with the result that the end of the lens removed from the lamp is well illuminated. From the above, it will be observed that, I supply a relatively long and readily understood signal, which is made clearly visible by means of an ordinary lamp, without impairing the primary function of the lamp. The greater length of the signal being removed from the lamp, avoids confusion with the numerous vari-colored lens employed in lamps.

The rear signal D may be identical with the front signal B, and, as illustrated herein, is identical except for the arrow-like indicator arm *d'*, which is stamped from sheet metal.

The rear bracket C includes an angle-member 48, one flange thereof serving to secure the bracket to a vehicle frame or body. On the other flange of the angle member 48 is a pivotally adjustable angle-link 49, the free flange of said link supplying a mounting for an extensible and collapsible reach C. Said reach comprises a tubular section 50 having an adjustable pivotal mounting on said free flange of said link 49 and a post 51 revoluble and slidable in said tubular section 50. A lock screw 52, in a collar 53 encompassing the free kerfed end of the section 50, secures the post 51 with respect to said section. Said post has a curved end 51ª equipped with a universally adjustable housing-support or plate 54, the housing 18 of the rear signal D being secured thereto in the manner that the front signal housing 18 is secured to a bracket reach 11. The attaching flange of the angle-member 48 may be secured underneath, on top of or at the side of any convenient support. The universal adjustment at the base of the bracket C, together with the longitudinal adjustment of the reach C and the universal adjustment of the plate 54, coupled with the argumenting angular adjustment of the curved post 51, provides for desirably locating the rear signal under the numerous conditions encountered in the various types of vehicles.

The actuator E (Figs. 10, 11 and 12) consists primarily of a housing 55, and a sheave or pulley 56 therein, said housing having a depending, dual cable and guide receiving terminal 55ª like the terminals 20 of the signal housings 18. The housing 55 has a removable cover 55ᵇ allowing access to the pulley 56. Said pulley is mounted on a shaft 57 journaled transversely of the housing 55, a head 57ª on the shaft supplying a mounting for a lever 58. The pulley 56 has an annular cable receiving groove 56ª therein, the rim of the pulley being recessed as at 59 (Fig 11) to receive a cable gripping clip 60, adapted to be clamped against the ends of the cable 34 by means of a screw 61. The ends of the cable 34 which reaches over the sheaves 19 of the front and rear signals B and D, are lapped beneath the clip 60 and bound by said clip upon the pulley 56. The ends of the tubular cable guides 10 are clamped in the split terminals 55ª of the housing 55 by a bolt 62. Radial notches 56ᵇ, 56ᶜ, 56ᵈ and 56ᵉ in the face of the pulley 56, are yieldingly engaged by a dog 63 slidable in the housing 55 and pressed inward against said pulley by an expansion spring 64, said spring being interposed between the outer end of said dog and an abutting plug 65 threaded in the bore of a hollow boss 66 on the side of the housing 55. Each of said notches serves as a "finder" for a given position of the indicator arms $d$ and $d'$. With the lever 58 tilted forward, and the notch 56ᵇ caught by the dog 63, the indicator arms $d$ and $d'$ lie horizontally pointing to the left relative to the direction travel (solid lines Fig. 3). With the lever 58 in upright position, the notch 56ᶜ is caught by the dog 63, the indicator arms $d$ and $d'$ pointing upward and designating continuance in travel. With the lever 58 tilted rearward to engage the notch 56ᵈ with the dog 63, the indicator arms $d$ and $d'$ point to the right. Further tilting of said lever 58 rearward engages the notch 56ᵉ with the dog 63 and shifts the indicator arms $d$ and $d'$ into position pointing downward and signaling "stop". Lugs 67 on the housing 55 form abutments for the lever 58 and serve to positively arrest the movement of the actuator pulley 56 at the extremities of its throw. The employment of these lugs avoids unnecessary strains upon the cable 34, which might otherwise occur under the careless manipulation of the lever 58. Said cable 34 is also relieved from strains in arresting the throw of the indicator arms $d$ and $d'$, by means of the positive stops embodied in the abutting pins 32 within the signal housings 18. The actuator housing E is mounted on a cowl bracket consisting of a plate 68 and arms 69 reaching therefrom. A bolt 70 passing through said arms and through said housing serves to clamp the latter, within the former, in various angular relations.

The tubular cable guides 10 are of ductile material, such as soft copper or iron, and are easily directed through any available clear space to span the distances between the adjustable signal housings 18 and the actuator housing 55. The single cable 34 is conducted through these guides 10 from the actuator to one signal, thence to the other signal and back to said actuator, the ends of the cable being joined, as explained, on the actuator pulley 56. These cable guides, having rigid supports in the signal and actuator housings, require little bracing, if any, between the ends thereof. To avoid undue friction between the cable 34 and the guides 10 at sharp turns, I provide novel joints 71, two of which are shown in Figs. 1 and 2. Each joint 71 (Fig. 9) comprises two identical cup-shaped bodies 72 having tubular, tangential terminals 73 split at their ends and fitted with bolts 74 to clamp the same upon the ends of tubular guides 10. These bodies 72 are joined by a bolt 75 to form a compartment, a sheave 76 being journaled, in said compartment, on said bolt 75. The cable 34, from one guide section 10, passes over the sheave 76 and into the companion guide section 10 in the various angular relations of the joint members 72. In assembling the guides 10, the bolts 75 are loose to permit self-adjustment of the joints 71, but when the desired adjustment thereof has been attained, said bolts are tightened to lock the joint and lend rigidity to said guides 10.

In signaling at day, the indicator arms are readily seen at the front and at the rear of a vehicle and the usual significance attached to the directions of said arms is quickly understood by pedestrians and drivers alike. At night, with the front lamps lighted, the indicator arm $d$ adjacent a front lamp 17 is clearly illuminated in the two important horizontal positions indicating turns to the right and to the left, said indicator being so proportioned and designed as to avoid confusion with other devices. The indicator arm $d'$ at the rear of the vehicle is visible at night in the light of nearby lamps, usually in the light from the lamps of a trailing vehicle. The device is universal in installation, the numerous conditions in the different types being readily accommodated through the angular and horizontal adjustment of the front signal housing, the angular adjustment of the actuator housing 55, the universal adjustment of the rear bracket C and the flexibility of the cable guides 10 aided by the adjustment of the joints 71. The provision of adjustable, positive stops for the indicator arms $d$ and $d'$ insures the proper limits of throw for said arms, under the various adjustments of the housings, and avoids stretching strains on the cable 34.

Changes in the specific form of my invention, as herein disclosed, may be made within the scope of what is claimed without departing from the spirit of my invention.

Having described my invention, what I claim as new and desire to protect by Letters Patent is:

1. In a device of the class described, a signal including a mounting and an indicator arm pivoted thereon, means for swinging said indicator arm, said mounting being adjustable angularly to suit various conditions and a stop to arrest the movement of said arm with respect to said mounting, said stop being adjustable to accord for the various angular relations of said mounting.

2. In a device of the class described, an angularly adjustable housing, an indicator arm pivoted on the housing, a stop to limit the throw of said arm, said stop being adjustable to accord for the various angular positions of the housing and means for moving the indicator arm.

3. The combination with a vehicle having front lamps, of an extensible and collapsible cross bracket spanning the space between said lamps, adjustable anchoring members at the ends of the bracket for securing said bracket to said lamps, a housing adjustable horizontally and angularly on said bracket near one of said lamps, an indicator arm pivoted medially on the housing, a sheave within the housing for turning said arm, a stop to limit the throw of said arm, said stop being adjustable to accord for the various angular positions of the housing upon the bracket, a cable passing over said sheave and an actuator for the cable removed from said housing, said indicator arm being movable, through the medium of said cable, into various positions including those wherein either end of said arm intercepts the rays of light from the adjacent lamp.

4. The combination with a vehicle having a lamp thereon, of an elongated light transmitting indicator pivoted medially of its ends, adjacent said lamp, said ends being severally movable into position intercepting the rays of light from the lamp, means carried by the indicator to reflect light from the lamp upon that portion of said indicator not directly illuminated by said lamp and means for turning the indicator.

5. The combination with a vehicle having a lamp thereon, of an elongated indicator having a light transmitting medium extending longitudinally thereof, said indicator being pivotally supported intermediate of its ends, said ends being severally movable into position intercepting the rays of light from the lamp, reflectors carried at each end of said indicator to deflect light from the lamp against that portion of the light transmitting medium not directly illuminated by said lamp and means for turning the indicator.

6. The combination with a vehicle having a lamp thereon, of a light transmitting indicator movable into position, wherein a portion thereof intercepts the light from said lamp, a reflector on the indicator arranged to deflect the light from the lamp and illuminate that portion of the indicator not disposed in front of the lamp, and means for shifting the indicator.

7. The combination with a vehicle having a lamp thereon, of a pivoted indicator arm, an arrow-like lens framed within the arm, said arm being tiltable into and out of position wherein the head of said lens is caused to intercept the rays of light from said lamp, a reflector carried by the arm and designed to indirectly illuminate the shaft of the lens and means for swinging the arm.

8. The combination with a vehicle having a lamp thereon, of an indicator arm, an elongated lens framed within the arm, said arm being movable into and out of position wherein one end of said lens is caused to intercept the rays of light from said lamp, light absorbing projections on the lens, a reflector carried by the arm and designed to illuminate the other end of the lens and means for moving the arm.

9. The combination with a vehicle having a lamp thereon, of an indicator arm, an arrow-like lens framed within the arm, said arm being pivoted medially and tiltable into and out of positions wherein the ends of said lens are caused to severally intercept the rays of light from said lamp, light absorbing projections on the shaft of the lens, reflectors carried near the ends of said arms and designed to illuminate that portion of the lens not directly lighted by the lamp and means for swinging the arm.

In testimony whereof, I have signed my name to this specification.

NELS H. NELSON.